Nov. 29, 1938.  A. B. BIRTLES  2,138,085
PORTABLE COMPOSITE FLOOR
Filed March 11, 1935  2 Sheets-Sheet 1

Inventor
Arthur B. Birtles.
By John L. Milton
Attorney

Nov. 29, 1938.  A. B. BIRTLES  2,138,085
PORTABLE COMPOSITE FLOOR
Filed March 11, 1935  2 Sheets-Sheet 2

Inventor
Arthur B. Birtles.
By John L. Mieton.
Attorney

Patented Nov. 29, 1938

2,138,085

UNITED STATES PATENT OFFICE 2,138,085

PORTABLE COMPOSITE FLOOR

Arthur B. Birtles, Louisville, Ky., assignor to Wood-Mosaic Co., Incorporated, Louisville, Ky., a corporation of Kentucky Application March 11, 1935, Serial No. 10,352

13 Claims. (Cl. 20—78)

My invention relates to a portable dance floor organized to be superimposed on an ordinary floor of a house and usually over a permanent covering, such as a carpet or rug.

The main object is to provide an equipment of the main field or panel composed of units embraced by a frame or border also composed of units and parts that can be readily assembled into a composite high grade dance floor, primarily for temporary service after which it can be expeditiously disassembled and stored within a small compass, all being accomplished by human hands without the use of tools or accessory apparatus.

Another object resides in fashioning the parts so as to present and maintain a practically flat top surface between the adjacent units, as well as the units per se, irrespective of the irregularities encountered in the permanent floor or the rug spread thereon.

A further object contemplates the provision of novel means for aligning and securing the units into a composite knockdown floor in a most substantial manner, to resist the strains to which the floor is subjected when in use, without the liability of any of the composite parts becoming displaced.

The floors of public dining rooms are frequently equipped with adamantine and/or fabric covering, all of which fail as a satisfactory dance floor, therefore the major object of my invention is to expeditiously convert same into a floor that inherently appeals to patrons.

It is also within the scope of my invention to provide a composite portable floor having the features adverted above and which can be handled by common labor, normally employed by public dining room proprietors and at the same time being thoroughly practicable.

With the foregoing and other objects, which will be revealed as the description of the details of the construction proceeds and hereinafter claimed, it must be understood that changes from the selected embodiment of my invention can be indulged without departing from the scope of my invention.

Drawings

Specification

The main or inner field is composed of sections or units and are referred to as the panel units. These are preferably, although not necessarily, formed in two sizes, A the larger and B the smaller, all of the A units being interchangeable and all of the B units being interchangeable. The units are disposed in alternate rows and in staggered arrangement, whereby the abutting ends of units of alternating rows are in substantial alignment and out of alignment with the abutting ends of the adjacent rows. The frame or border is composed of units D, C the length being selected so as to be out of alignment with the abutting faces of the panel units.

Owing to the fact that the units of the composite floor are frequently installed on uneven surfaces and on carpets of uneven thickness, or on a combination of the two, the edges of the abutting surfaces have been fashioned with a radius R as shown in Fig. 7 and in the modifications, in order that there will be no projecting edge to disturb the desired planimetric assembly. While a theoretical perfect plane is the objective, it is understood that this term is used to indicate the practical embodiment of same.

One form of maintaining the units assembled and fortified against disturbance when the floor is in use is illustrated in Fig. 7 in the bifurcated anchor, having two similar cylindrical arms 1a, which are fabricated so as to effect a close fit within the counter-sunk holes 8, 8 of the units. It will be noted that the top surface or bridge 1 has been made to register with the top surface of the units. The bridge 1 is provided with threaded hole 1b for the reception of a machine screw for the purpose of removing the anchor when the floor is to be disassembled.

Figure 3:
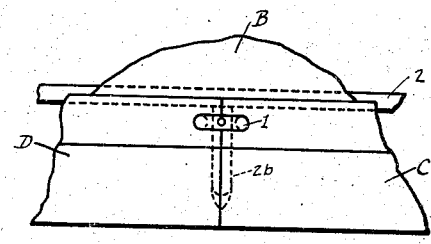
Fig. 3 is a fragmentary plan view of abutting ends of border units and a portion of a panel unit.
Figure 4:
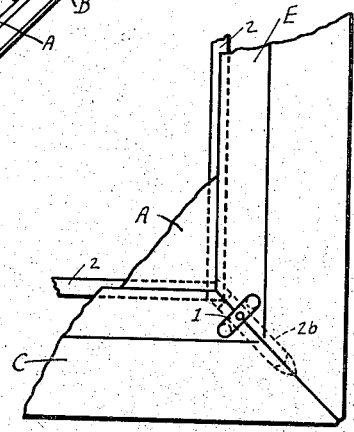
Fig. 4 is a fragmentary plan view of any corner of the border.
Figure 5:
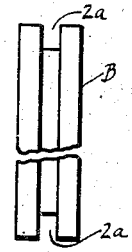
Fig. 5 is an end view of any one of the panel units.
Figure 6:
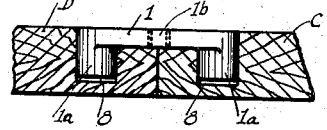
Fig. 6 is an enlarged view of the "anchor" shown in Fig. 7 as lodged in the ends of two of the abutting units.

To maintain the several units in any practical and substantial alignment, the abutting faces of the panel units and those faces of the border units which abut the panel units are provided with grooves 2a for the reception of removable spline 2, all of said members being so proportioned and arranged that they will be completely interchangeable. The border is fashioned with a bevel, which is obviously adopted to prevent tripping when walking on to the dance floor from the permanent floor. The abutting faces of the corners of the border have necessarily a different treatment, a metal spline 2b, Figs. 3 and 4 being employed, however, the principle remains the same.

Figure 12:
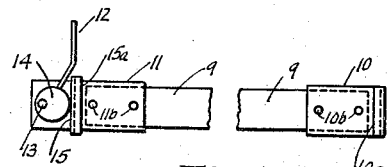
Fig. 12 is a plan view of the assembly of the clamping means used for embracing and securing the several sections of the panel and border units into an integral whole.
Figures 13, 14:
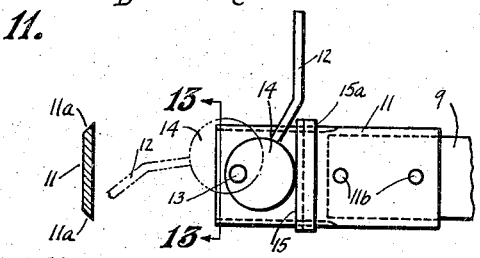
Fig. 13 is a cross sectional view of Fig. 12 along the line 13 shown in Fig. 14.
Fig. 14 is an enlarged plan view of the left hand end of the clamping device shown in Fig. 12.
Figure 15:
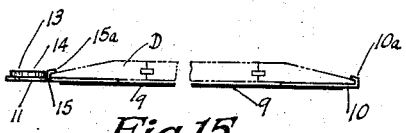
Fig. 15 is an elevational view of the clamping means showing units in dotted lines and disposed on a normal floor covering indicated by the heavy black line.
Figures 16, 17:
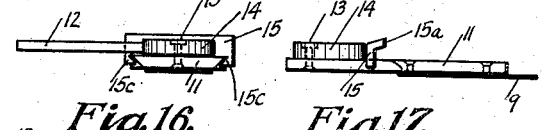
Fig. 16 is an end view of Fig. 14, as observed from the left hand side.
Fig. 17 is a side elevational view of Fig. 14.

Supplemental to or independent of the anchor, dealt with above, other clamping means can be employed for detachably binding the several units into a composite assembly. In Figs. 12 and 15 such a device is illustrated, 9 being a flexible metallic strip on to one end of which is secured a metal hook 10, of heavy material, having lip 10a while on the other end is mounted a similarly heavy plate 11, these are secured by rivets 10b and 11b. Plate 11 carries an eccentric 12 rotating on pivot 13 fixed into said plate. The eccentric is provided with a cam 14 which is shown in Fig. 14 in solid lines having its face contacting slide 15, which is fashioned with a lip or hook 15a and also a dovetail for slidably securing it on to 11, which is in turn provided with bevel edges 11a to slidably receive same. It will therefore be perceived that the eccentric traveling from the dotted position shown in Fig. 14 to the position shown in solid lines exerts a powerful clamping action and that the necessary amount of travel of slide 14 can be effected with the result of securely binding the several units that fall in the path of the exerted force. The force is obviously exerted between hooks 10a and 15a and applied to the section of the portable floor lying below the planar center of same. Consequently an upward buckling force results. It necessarily follows that the weight of humans incident to the intended use of the floor will cause the desired tightening effect.

Figure 1:
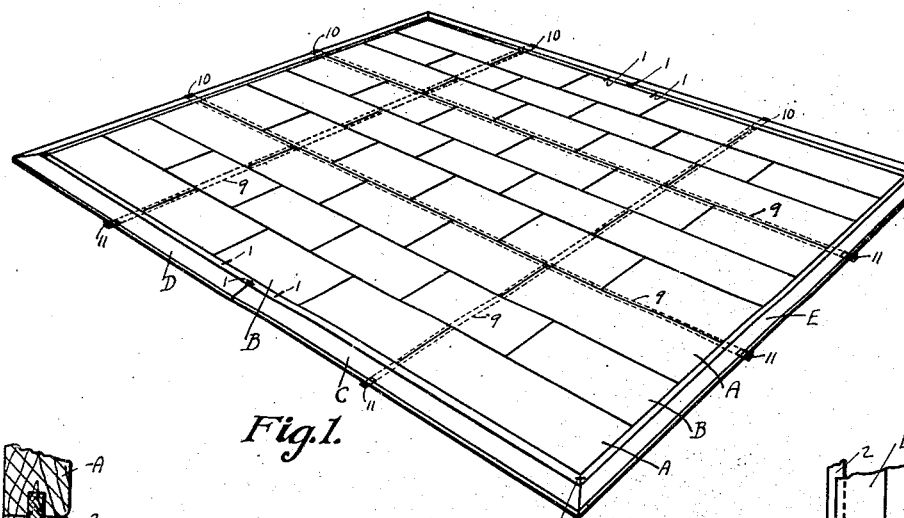
Figure 1 is a perspective view of a complete assembly of my composite knockdown portable floor.
Figure 2:
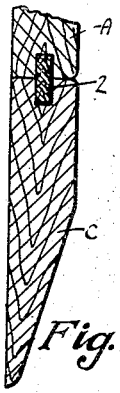
Fig. 2 is a cross section of any of the border units, together with a fragmentary cross section of a panel unit.
Figure 11:
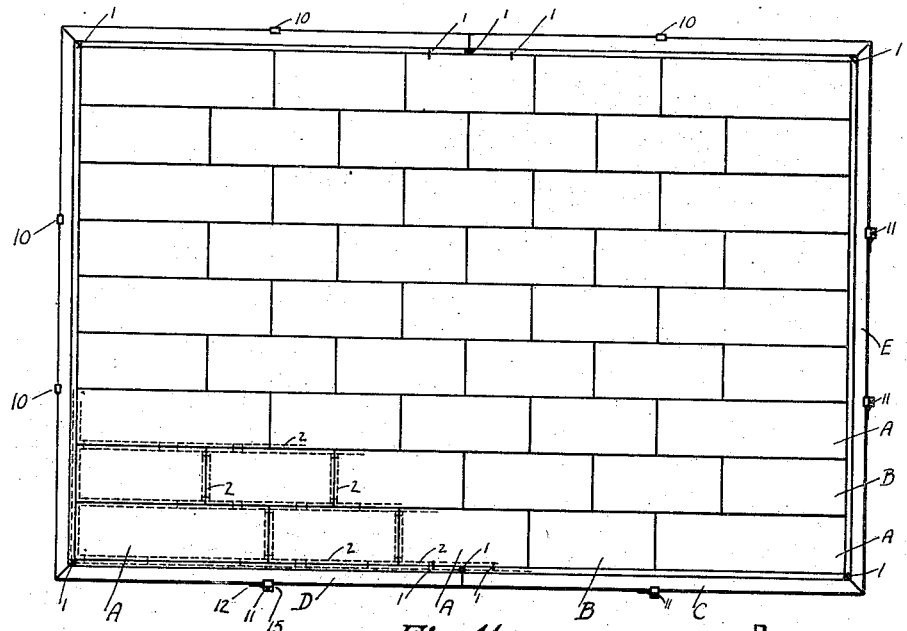
Fig. 11 is a plan view of the completed floor as assembled for use.

In Figs. 1 and 11, four of the clamping units are indicated, while in larger or smaller composite floors, the numbers of same can be selected according to conditions encountered and whether or not they are augmented by anchors, Fig. 7. It must be remembered that either one of these systems of securing the units can be employed or a combination of same. From experience gained up to the present time, I preferably use a combination of the two means, i. e., anchors as shown in the borders to prevent lineal separation of the abutting faces and the use of the clamping means shown in Fig. 12 to prevent separation between the border and the panel units.

The proportions of each type of unit and their relations to the border and binding efforts of the anchors, together with the clamps, result in a composite whole. A floor 20' x 30' can, after assembly, be manually lifted as a whole without separation. The assembled floor can be regarded as a mat.

Figure 18:
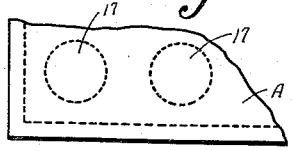
Figs. 18, 19, 20 and 21 are respectively fragments of panel units shown in plan and elevational views, slightly modified.
Figure 19:
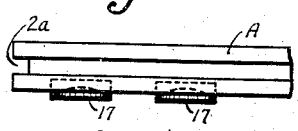

Unit A is shown in Figs. 18 and 19 having relatively shallow holes into which are inserted rubber disks which can be either solid or cupped, the latter being so proportioned that when the floor is assembled the cups will function to secure the units similar to the well known principle found in vacuum cup articles. By a proper distribution of these cups, a floor when disposed on a smooth surface will function to locate and secure the units without the assistance of anchors shown in Fig. 4 or other clamping or securing means.

Figure 20:
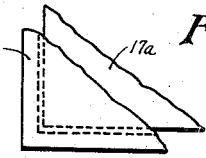
Figure 21:
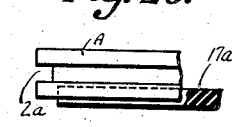

In Figs. 20, 21 I have shown sheets of a similar material (rubber) inserted and extending over substantially the entire under surface of the unit. This feature has been added to provide a cushion, not only for providing comfort when the floor is in use, but to absorb strains. This being in effect a vibration dampener.

Figure 8:
Figs. 8, 9 and 10 are modifications of Fig. 2 showing a floor cover disposed on and/or attached to the bevel of the border.
Figure 10:
Figure 9:
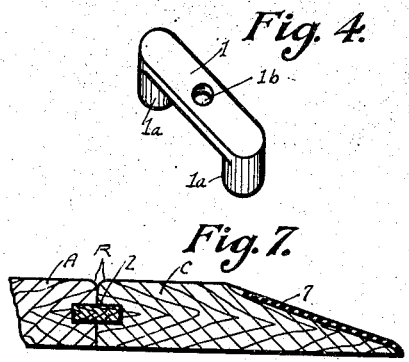

In Fig. 8, the edge of rug 4, is shown tucked into a groove in the bevel of border unit C and secured in kerf 3. In Fig. 9, a rubber facing is shown cemented to unit C, while in Fig. 10, the edge of rug 4 is shown lodged in a groove and secured by strip 5 and screw 6. Whether securing means is employed or not can be left to the discretion of the owner.

I claim:

1. The combination in a composite, portable, knock-down self contained floor structure comprising a plurality of units grouped into a substantially planar structure and a detachable flexible clamping means, external to said units, said means embracing the assembled units below the planar center of same for effecting a composite floor.

2. The combination in a composite portable knock-down floor structure comprising a plurality of units assembled into a substantially planar structure and a detachable clamping means having a strap equipped with a hook at one end and a cam lock at the other end, said means embracing the assembled units with the hook engaging one margin and the cam lock engaging the opposite margin of the structure for effecting a composite floor.

3. The combination in a composite portable knock-down floor structure comprising a plurality of units grouped into a substantially planar structure the units being disposed on a yielding surface in alternate rows and in staggered arrangement, whereby the abutting ends of said units of alternate rows are in substantial alignment and out of alignment with the abutting ends of the adjacent rows and a detachable flexible clamping means, exterior to said units, said means embracing the assembled units for effecting a composite floor.

4. The combination in a composite portable knock-down floor structure comprising a plurality of units grouped into a substantially planar structure the units being disposed on a yielding surface in alternate rows and in staggered arrangement, whereby the abutting ends of said units of alternate rows are in substantial alignment and out of alignment with the abutting ends of the adjacent rows, means associated with the abutting faces of the units for effecting planimetric alignment of the units and a detachable flexible clamping means, said means embracing the assembled units for effecting a composite floor.

5. The combination in a composite knock-down floor structure comprising a plurality of units assembled into a substantially planar structure the units being disposed in alternate rows and in staggered arrangement, whereby the abutting ends of said units of alternate rows are in substantial alignment and out of alignment with the abutting ends of the adjacent rows, means associated with the abutting faces of the units for effecting planimetric alignment of the units and a detachable clamping means having a flat strap equipped with a hook at one end and a cam lock at the other end, said means embracing the assembled units with the hook engaging one margin and the cam lock engaging the opposite margin of the structure for effecting a composite floor.

6. The combination in a composite portable knock-down floor structure comprising a plurality of interchangeable sectional panel units assembled into a substantially planar yielding surface and a detachable clamping means, exterior to said units, said means embracing the units below the planar center of same for effecting a composite floor.

7. The combination in a composite knock-down floor structure comprising a plurality of interchangeable sectional border units and a plurality of interchangeable sectional panel units disposed on and unsecured to a substantially flat-yielding surface and a quick detachable clamping means, exterior to said units, said means embracing the units below the planar center of same for effecting a composite floor.

8. The combination in a composite knock-down floor structure comprising a plurality of interchangeable sectional border units and a plurality of interchangeable sectional panel units disposed on a substantially flat yielding surface, the units being disposed in alternate rows and in staggered arrangement, whereby the abutting ends of said units of alternate rows are in substantial alignment and out of alignment with the abutting ends of the adjacent rows and a detachable flexible clamping means, exterior to said units, said means embracing the units for effecting a composite floor.

9. The combination in a composite knock-down floor structure comprising a plurality of interchangeable sectional border units and a plurality of interchangeable sectional panel units disposed on a substantially flat yielding surface, the units being disposed in alternate rows and in staggered arrangement, whereby the abutting ends of said units of alternate rows are in substantial alignment and out of alignment with the abutting ends of the adjacent rows, means associated with the abutting faces of the units for effecting planimetric alignment of the units and a detachable flexible clamping means, exterior to said units, said means embracing the units for effecting a composite floor.

10. The combination in a composite knock-down floor structure comprising a plurality of interchangeable sectional border units and a plurality of interchangeable sectional panel units disposed on a substantially flat yielding surface, the units being disposed in alternate rows and in staggered arrangement, whereby the abutting ends of said units of alternate rows are in substantial alignment and out of alignment with the abutting ends of the adjacent rows, means associated with the abutting faces of the units for effecting planimetric alignment of the units and a detachable clamping means, exterior to said units, having a flat strip equipped with a hook at one end and a cam lock at the other end, said means embracing the units with the hook engaging one margin and the cam lock engaging the opposite margin of the structure for effecting a composite floor.

11. The combination in a composite knock-down floor structure comprising a plurality of units assembled into a substantially planar structure and a detachable clamping means consisting of a flexible strip placed under the units and having a hook at one end and a cam lock at the other end, said means embracing the assembled units with the hook engaging one margin of the structure and the cam lock engaging the opposite margin of the structure for effecting a composite floor.

12. The combination in a composite portable knock-down floor structure comprising a plurality of separable rectangular units assembled into a substantially planar structure, means associated with the abutting faces of the units for effecting planimetric alignment of the units and a detachable securing means engaging the said units below the planar center of same for effecting a composite floor.

13. The combination in a composite portable knock-down floor structure comprising a plurality of rectangular units grouped into a substantially planar structure, said units being formed with vertical holes disposed adjacent the abutting faces with a channel connecting the adjacent holes, and detachable bifurcated anchors inserted in said holes and channels, said units and anchors cooperating to produce a composite portable floor, each of said anchors being fashioned with a threaded hole to receive a screw to effect removal of the anchors.

ARTHUR B. BIRTLES.